US005594614A

United States Patent [19]

Kirch

[11] Patent Number: 5,594,614

[45] Date of Patent: Jan. 14, 1997

[54] SURGE ARRESTER

[75] Inventor: Johannes Kirch, Berlin, Germany

[73] Assignee: Siemens Aktiengesellschaft, Munich, Germany

[21] Appl. No.: 481,412

[22] PCT Filed: Dec. 2, 1993

[86] PCT No.: PCT/DE93/01158

§ 371 Date: Aug. 25, 1995

§ 102(e) Date: Aug. 25, 1995

[87] PCT Pub. No.: WO94/14216

PCT Pub. Date: Jun. 23, 1994

[30] Foreign Application Priority Data

Dec. 16, 1992 [DE] Germany ........................... 9217480 U

[51] Int. Cl.⁶ ........................................ H02H 9/04

[52] U.S. Cl. ........................................ 361/127; 361/130

[58] Field of Search .............................. 361/127, 130, 361/119; 338/21; 337/34

[56] References Cited

U.S. PATENT DOCUMENTS 3,715,626 2/1973 Olsen ..................................... 361/128

FOREIGN PATENT DOCUMENTS

| | | | |
|---|---|---|---|
| 1003485 | 1/1977 | Canada | 361/127 |
| 1463149 | 1/1969 | Germany . | |
| 1638121 | 3/1971 | Germany . | |
| 2655557 | 6/1978 | Germany . | |
| 3417648 | 10/1985 | Germany . | |
| 3511084 | 8/1986 | Germany . | |
| 0552289 | 7/1974 | Switzerland . | |
| 0654145 | 1/1986 | Switzerland . | |

*Primary Examiner*—Todd DeBoer
*Attorney, Agent, or Firm*—Kenyon & Kenyon

[57] ABSTRACT

A surge arrester (1) for high voltage has a porcelain housing (2) with safety shields (3, 4, 7, 8). In the central area along the longitudinal axis of the surge arrester (1), safety shields (3) with a larger diameter may alternate with safety shields (4) having a smaller diameter. The surge arrester (1) has blow-out apertures (5) at its ends, and gas under high pressure flows out of these apertures in the event of a-short-circuit current. To protect the safety shields from damage, the safety shields (7, 8) that are closest to the blow-out apertures (5) are constructed with smaller diameters than the other safety shields.

2 Claims, 1 Drawing Sheet

SURGE ARRESTER

BACKGROUND OF THE INVENTION

The present invention concerns a cylindrical surge arrester with a porcelain housing having safety shields surrounding the housing and at one end at least one blow-out aperture that is directed parallel to the cylinder axis of the surge arrester at the surface of the porcelain housing.

Such a surge attester is known, for example, from German patent DE-OS 2, 655,557. The surge arrester described therein has a porcelain housing with surrounding safety shields, all of which have the same outside diameter. In the event of a high short-circuit current, hot gas is blown over the safety shields and the surface of the surge arrester parallel to its axis from a blow-out aperture. The hot gas is blown out at a high pressure, and the flow of gas can break away the porcelain from the safety shields.

German patent DE-A 3,417,648 discloses a surge arrester that has a porcelain housing surrounded with safety shields. In this device the safety shield closest to the blow-out aperture has a smaller diameter than the safety shield that follows it.

SUMMARY OF THE INVENTION

The present invention provides a surge arrester that reduces the danger of damage to the safety shields.

According to the present invention by the fact that the diameter of the safety shields closest to the blow-out aperture increases with the distance from the blow-out aperture in at least two steps from one safety shield to the next.

In most cases the core of the porcelain housing is cylindrical.

Due to the fact that the first safety shields have a smaller diameter than the other safety shields, the first safety shields do not present a large obstacle for the quenching gas flow, and therefore the mechanical load at this point is greatly reduced. The term "diameter" refers to the distance by which a safety shield projects beyond the core of the porcelain housing. Some of the gas stream is deflected by the first safety shield in such a way that the succeeding safety shields are not stressed by the gas. At a greater distance from the blow-out aperture the gas stream has expanded and is also cooler, so there is no risk that the gas will damage the other safety shields.

It is advantageous for the safety shields to be arranged in a barrel shape in the longitudinal cross section of the surge arrester. This creates an especially favorable guidance of the gas discharged.

The other safety shields may be designed, for example, as safety shields with a larger diameter alternating with safety shields having a smaller diameter along the longitudinal axis of the surge arrester.

If the surge arrester has two blow-out apertures, one at each of its opposite ends, it is expedient for the safety shield closest to each blow-out aperture to have a smaller diameter.

BRIEF DESCRIPTION OF THE DRAWINGS

The invention is illustrated in the following figure and described in greater detail below.

DETAILED DESCRIPTION

Figure 1:
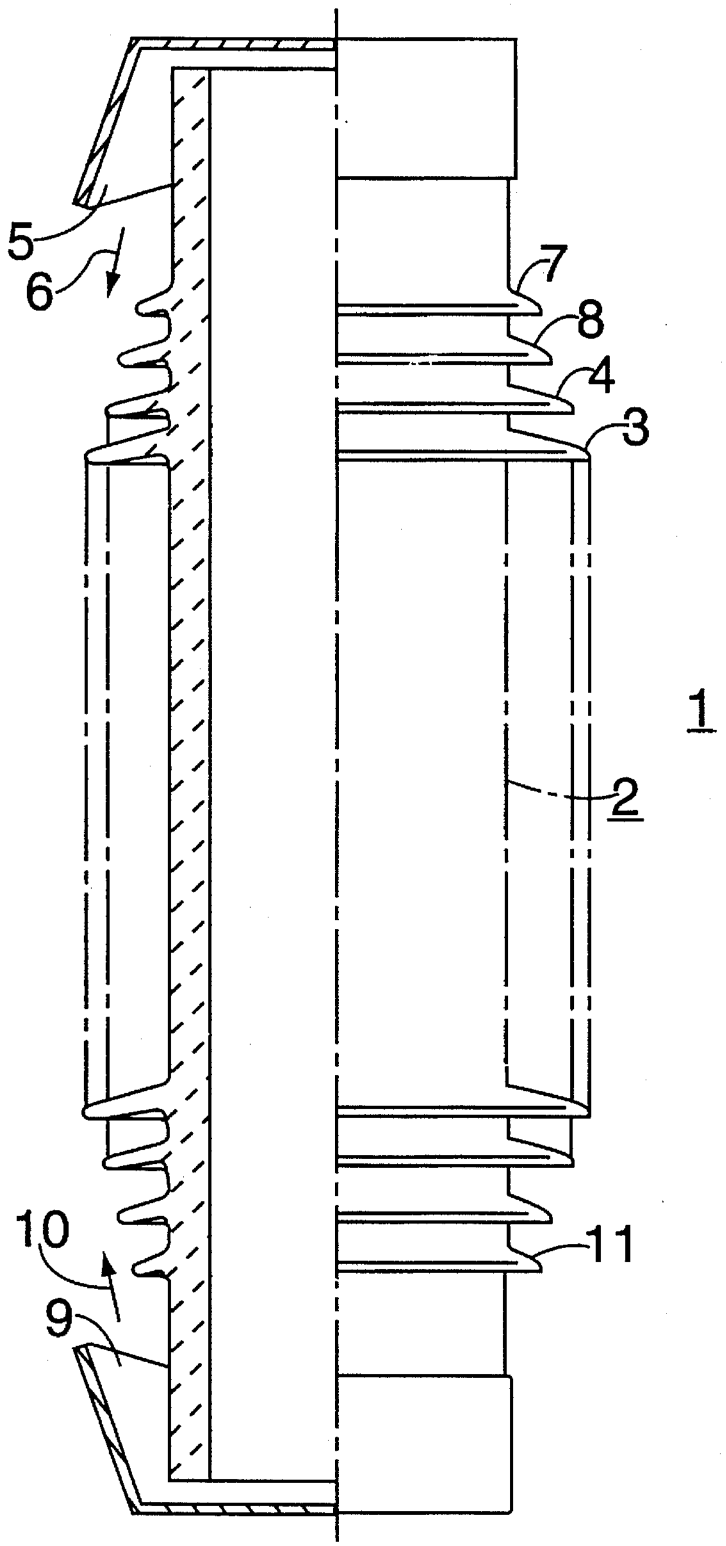
FIG. 1 shows a surge arrester according to this invention in a partially sectional view.

Surge arrester 1 has a cylindrical barrel shape. For example, it may have one or more columns of metal oxide discharge resistors on the inside. Housing 2 of the surge arrester is a porcelain housing with surrounding safety shields 3. In the central area along the longitudinal axis of the housing, safety shields 3 with a larger diameter alternate with safety shields 4 having a smaller diameter.

Surge arrester 1 has blow-out apertures 5, 9 at its ends, so in the event of a high short-circuit current, if an appropriate safety device such as a rupture disk is activated, hot gas flows out of these blow-out apertures at a high pressure in the direction of arrows 6, 10.

To protect safety shields 3, 4 from the effects of the gas, two safety shields 7, 8 having smaller diameters than safety shields 3, 4 are placed in front of them. Safety shield 7 which is closest to blow-out aperture 5 has the smallest diameter. In this way, the gas flow denoted by arrow 6 is deflected, and the load on safety shields 3, 4 is thereby reduced. The same set-up with safety shields of a smaller diameter located upstream can be used at the other end of the surge arrester, as shown in the figure.

The design of the porcelain housing according to this invention prevents destruction of whichever of safety shields 7, 11 is closest to the blow-out apertures 5, 9, due to the high pressure of the gas discharged.

I claim:

1. A housing for a cylindrical surge arrester where the housing is porcelain and comprises:

a plurality of surrounding safety shields; and at least one blow-out aperture at one end aimed parallel to the cylindrical axis of the surge arrester at the surface of the housing;

wherein the safety shields closest to the blow-out aperture have diameters that increase with distance from the blow-out aperture from one safety shield to the next in at least two increments, and wherein the safety shields closest to the blow-out aperture deflect a gas blown out of the blow-out aperture away from the housing and from the remaining safety shields.

2. The housing of claim 1, wherein the safety shields form a barrel shape along the longitudinal axis of the surge attester.

* * * * *